(12) United States Patent
Schildwaechter et al.

(10) Patent No.: US 12,385,746 B2
(45) Date of Patent: Aug. 12, 2025

(54) METHOD, CONTROL UNIT, AND SYSTEM FOR CONTROLLING AN AUTOMATED VEHICLE

(71) Applicant: Robert Bosch GmbH, Stuttgart (DE)

(72) Inventors: Christian Schildwaechter, Besigheim (DE); Hong Quan Tran, Heilbronn (DE); Yupeng Wu, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 355 days.

(21) Appl. No.: 17/956,455

(22) Filed: Sep. 29, 2022

(65) Prior Publication Data

US 2023/0112417 A1 Apr. 13, 2023

(30) Foreign Application Priority Data

Oct. 12, 2021 (DE) ............. 10 2021 211 463.6

(51) Int. Cl.
*G01C 21/30* (2006.01)
*B60W 60/00* (2020.01)
(Continued)

(52) U.S. Cl.
CPC ......... *G01C 21/30* (2013.01); *B60W 60/0013* (2020.02); *B60W 60/0015* (2020.02);
(Continued)

(58) Field of Classification Search
CPC ............... G01C 21/30; G01C 21/3804; B60W 60/0013; B60W 60/0015; B60W 2554/40;
(Continued)

(56) References Cited

U.S. PATENT DOCUMENTS 8,521,352 B1\* 8/2013 Ferguson ............. G05D 1/0272
701/25
9,663,104 B2\* 5/2017 Hauler .................. B60W 30/08
(Continued)

FOREIGN PATENT DOCUMENTS

DE 102016225213 A1 6/2018
DE 102019216722 A1 5/2021

*Primary Examiner* — Christian Chace
*Assistant Examiner* — Richard Edwin Geist
(74) *Attorney, Agent, or Firm* — NORTON ROSE FULBRIGHT US LLP (57) ABSTRACT

A method for controlling an automated vehicle. In a first method part, the instantaneous surroundings of the automated vehicle are detected using an on-board surroundings sensor system. A localization of the automated vehicle takes place based on a comparison of the data of the surroundings sensor system to a previously provided HD localization map. A map-based surroundings model is generated, in a second method part representing a normal mode, and is used for planning the behavior and the trajectory of the automated vehicle. In a third method part representing a safety mode, carried out in parallel to or as an alternative to the first method part, the instantaneous surroundings of the automated vehicle are detected using the on-board surroundings sensor system. Based on the data ascertained in the process, a map-less surroundings model is generated and used for planning the behavior and the trajectory of the automated vehicle.

16 Claims, 6 Drawing Sheets (51) Int. Cl.
  *G01C 21/00* (2006.01)
  *G01S 19/49* (2010.01)
(52) U.S. Cl.
  CPC .......... *G01S 19/49* (2013.01); *B60W 2554/40* (2020.02); *B60W 2556/40* (2020.02); *G01C 21/3804* (2020.08)
(58) Field of Classification Search
  CPC ... B60W 2556/40; G01S 19/49; G05D 1/0077
  See application file for complete search history.

(56) References Cited

U.S. PATENT DOCUMENTS

| | | | |
|---|---|---|---|
| 11,402,842 B2* | 8/2022 | Liu | G05D 1/0257 |
| 11,608,080 B2* | 3/2023 | Oltmann | B60W 60/0015 |
| 11,867,514 B2* | 1/2024 | Mu | G01C 21/3667 |
| 11,945,470 B2* | 4/2024 | Oltmann | B60W 10/184 |
| 11,999,372 B2* | 6/2024 | Lee | G01C 21/3492 |
| 12,062,202 B2* | 8/2024 | Shao | G06T 7/50 |
| 2018/0087907 A1* | 3/2018 | DeBitetto | G01S 19/46 |
| 2020/0089232 A1* | 3/2020 | Gdalyahu | G01C 21/3602 |
| 2023/0115708 A1* | 4/2023 | Xiang | G08G 1/16 701/23 |

* cited by examiner

METHOD, CONTROL UNIT, AND SYSTEM FOR CONTROLLING AN AUTOMATED VEHICLE

CROSS REFERENCE

The present application claims the benefit under 35 U.S.C. § 119 of German Patent Application No. DE 10 2021 211 463.6 filed on Oct. 12, 2021, which is expressly incorporated herein by reference in its entirety.

FIELD

The present invention relates to a method for controlling an automated vehicle. The present invention furthermore relates to a control unit for carrying out the method as well as to a computer program and to a memory medium including such a computer program.

BACKGROUND INFORMATION

High definition (HD) planning and localization maps are indispensable for highly automated driving starting at Level 2+, the system performance and reliability required for this purpose drastically increasing compared to simpler assistance systems. For localization, the automated vehicle uses a suitable localization map, a vehicle-internal localization module being able, based on this localization map serving as a knowledge base, to ascertain the instantaneous location and position of the automated vehicle by a comparison of certain features detected with the aid of on-board surroundings sensors to the map. The data for localization maps are collected in the process by a certain sensor, e.g., radar, LIDAR or camera, with the aid of multiple trips on the same route. Subsequent to the localization module, a vehicle-internal planning module makes certain behavior and movement decisions on the basis of a planning map, which was also collected in advance. In contrast to the localization map, the planning map additionally also includes the road topology and geometry information at the traffic lane level as well as semantic context, such as traffic signs and traffic light positions. The accuracy and wealth of information of these two map types undoubtedly surpasses today's sensor performance. The extraction of comprehensive semantic pieces of information directly from raw sensor data in real time represents a major challenge, in particular, in complex traffic scenarios. Prepared HD maps are thus indispensable for a reliable and intelligent maneuvering from point A to B.

Yet, situations occur, even with the aid of connectivity services and cloud sourcing, in which the HD maps are no longer up-to-date or the localization module no longer supplies sufficient accuracy. Since a navigation based on such data which no longer agree with the real physical world may have fatal consequences, most current HD map-based planning systems either simply shut down or carry out dangerous maneuvers so that the safety driver has to take over the control.

SUMMARY

It is an object of the present invention to also ensure the safety of the automated driving function of vehicles in those situations in which a localization based on an HD map is not possible with sufficient accuracy. This object may be achieved with the aid of features of the present invention. Advantageous embodiments of the present invention are disclosed herein.

According to the present invention, a method for controlling an automated vehicle is provided. According to an example embodiment of the present invention, in a first method part, the instantaneous surroundings of the automated vehicle are detected with the aid of an on-board surroundings sensor system, and a localization of the automated vehicle takes place based on a comparison of the data of the surroundings sensor system to a previously provided HD localization map. In the process, a map-based surroundings model of the instantaneous surroundings of the automated vehicle is generated, in a second method part representing a normal mode, based on a global position of the automated vehicle ascertained during the localization and is used for planning an instantaneous trajectory of the automated vehicle. Furthermore, in a third method part representing a safety mode, which is carried out in parallel to or as an alternative to the first method part, the surroundings of the automated vehicle are detected with the aid of the on-board surroundings sensor system, and, based on the data ascertained in the process, a map-less surroundings model of the instantaneous surroundings of the automated vehicle is generated and used for planning an instantaneous trajectory of the automated vehicle. Finally, the instantaneous trajectory calculated in the normal mode or in the safety mode is output for controlling the movement of the automated vehicle along the particular trajectory. As a result of the additional safety mode (fall-back mode), a fall-back function is created, which allows an automated vehicle to continue its trip even when no HD maps are available, or when a sufficiently precise localization is not possible based on the provided HD maps. While the normal mode offers an intelligent driving function thanks to the HD maps, the safety mode focuses on the handling of essential physical conditions. As a result of the safety mode, the automated vehicle is able to maneuver safely before coming to a safe stop, instead of effectuating a thoughtless emergency brake application in the case of a changed road structure or a malfunction of the localization. Overall, the driving safety is enhanced by the additional safety mode when using the highly automated driving function.

In one specific example embodiment of the present invention, it is provided that, in a fourth method part, the accuracy of the localization from the first method part is checked. In the case that, during the localization, a precise global position of the automated vehicle was ascertained, the instantaneous trajectory calculated in the second method part is output for controlling the movement of the automated vehicle. In the case that, during the localization, no or only an imprecise global position of the automated vehicle was ascertained, the instantaneous trajectory calculated in the third method part is output for controlling the movement of the automated vehicle. Due to the repeated check of the localization results, it is ensured that, in the case of an error, a switch from the normal mode into the safety mode may take place particularly quickly and seamlessly.

In one further specific example embodiment of the present invention, it is provided that the distance traveled by the vehicle is detected with the aid of an on-board odometry unit. In the case that the localization, in a present method cycle, does not supply a precise global position of the automated vehicle, the instantaneous global position of the automated vehicle is ascertained based on the global position of the automated vehicle ascertained during the last accurate localization, and the distance of the automated vehicle detected since then with the aid of the odometry unit. This procedure makes it possible to reconcile the map segment generated locally in the safety mode with the available planning map. In this way, a particularly seamless switch into the normal mode is made possible.

In one further specific example embodiment of the present invention, it is provided that the map-less surroundings model ascertained in the third method part is used for validating the correctness of at least one provided HD map and/or for checking the results of the localization from the first method part. By checking the correctness of the provided HD maps and checking the results of the localization, it may be decided more quickly whether a switch into the safety mode is necessary. In both instances, the driving safety of the automated vehicle is enhanced.

In one further specific example embodiment of the present invention, it is provided that the planning of the behavior of the automated vehicle in the second method part takes place with a focus which is directed both at the driving safety and at an intelligent and comfortable mode of driving, while the planning of the behavior of the automated vehicle in the third method part takes place with a focus which is essentially directed at the driving safety. Due to the degradation of the planning of the behavior of the automated vehicle in the safety mode, more computing capacity is available for the computing operations necessary for ensuring the driving safety. In this way, the driving safety of the automated vehicle may be enhanced with the aid of this procedure.

In one further specific example embodiment of the present invention, it is provided that a traffic lane model is generated based on roadway boundaries of a presently negotiated road which are detected with the aid of the on-board surroundings sensor system, the traffic lane model in the third method part being used for generating a corresponding segment of a local planning map, and subsequently, with the aid of the on-board surroundings sensor system, dynamic objects and obstacles detected in the surroundings of the automated vehicle being added to the newly generated segment of the local planning map to generate the map-less surroundings model. In this way, a local planning map may be generated in a particularly effective manner in the safety mode.

In one further specific example embodiment of the present invention, it is provided that the map-less surroundings model in the third method part is generated in a vehicle-based local coordinate system. In the process, the objects included in the map-less surroundings model are transformed from the vehicle-based local coordinate system into a global coordinate system underlying the HD planning map to ensure a seamless transition from the normal mode into the safety mode. This procedure enables a particularly rapid switch between the normal mode and the safety mode, thereby enhancing the driving safety.

In one further specific example embodiment of the present invention, it is provided that the planning of the behavior and of the trajectory of the automated vehicle carried out in the second method part based on the map-based surroundings model is paused when the localization in a present method cycle does not supply a precise global position of the automated vehicle. In this way, the computing capacity available for the safety mode may be increased. A particularly precise map-less surroundings model may be generated in this way, and the calculation of the driving trajectory based thereon may be optimized. In this way, the driving safety of the automated vehicle is enhanced.

According to one further aspect of the present invention, a control unit for an automated vehicle is provided, which is configured to carry out at least some of the steps of the aforementioned method. The control unit includes a localization module designed for ascertaining a global position of the automated vehicle, based on a comparison of a digital HD localization map to data of an on-board surroundings sensor system, as well as a primary planning unit and a secondary planning unit. The primary planning unit includes a primary surroundings modeling module, designed for generating a map-based digital model of the surroundings of the automated vehicle, using a provided HD planning map, data of the on-board surroundings sensor system, and data of an on-board odometry unit, as well as a primary planning module, designed for planning a behavior and a trajectory of the automated vehicle, based on the global position of the automated vehicle ascertained by the localization module and a provided HD planning map. The secondary planning unit includes a map-less surroundings modeling module, designed for generating a map-less surroundings model of the surroundings of the automated vehicle, based on the data provided by the surroundings sensor system and the odometry unit, as well as a secondary planning module, designed for planning the behavior and the trajectory of the automated vehicle, based on the map-less surroundings model. The control unit results in the advantages described in connection with the method according to the present invention.

In one specific embodiment of the present invention, it is provided that the control unit furthermore includes a switching module, designed for checking the accuracy of the global position of the automated vehicle ascertained by the localization module. In the process, the activation module is furthermore designed to switch the operation of the automated vehicle from a normal mode, in which the control of the automated vehicle is carried out based on the trajectory provided with the aid of the primary planning module, to a safety mode, in which the control of the automated vehicle is carried out based on the trajectory provided with the aid of the secondary planning module, if the check shows that no precise global position of the automated vehicle was ascertained by the localization module. The advantages described in connection with the method result for such a control unit.

According to one further aspect of the present invention, a computer program encompassing commands is furthermore provided, which, during the execution of the computer program by a computer, prompt the computer to carry out the above-described method. The advantages described in connection with the method also result for the computer program.

A computer-readable memory medium is also provided, on which the aforementioned computer program is stored. In this respect, the advantages described in connection with the method also result for the computer-readable memory medium.

The present invention is described in greater detail hereafter based on figures.

DETAILED DESCRIPTION OF EXAMPLE EMBODIMENTS

Figure 1:
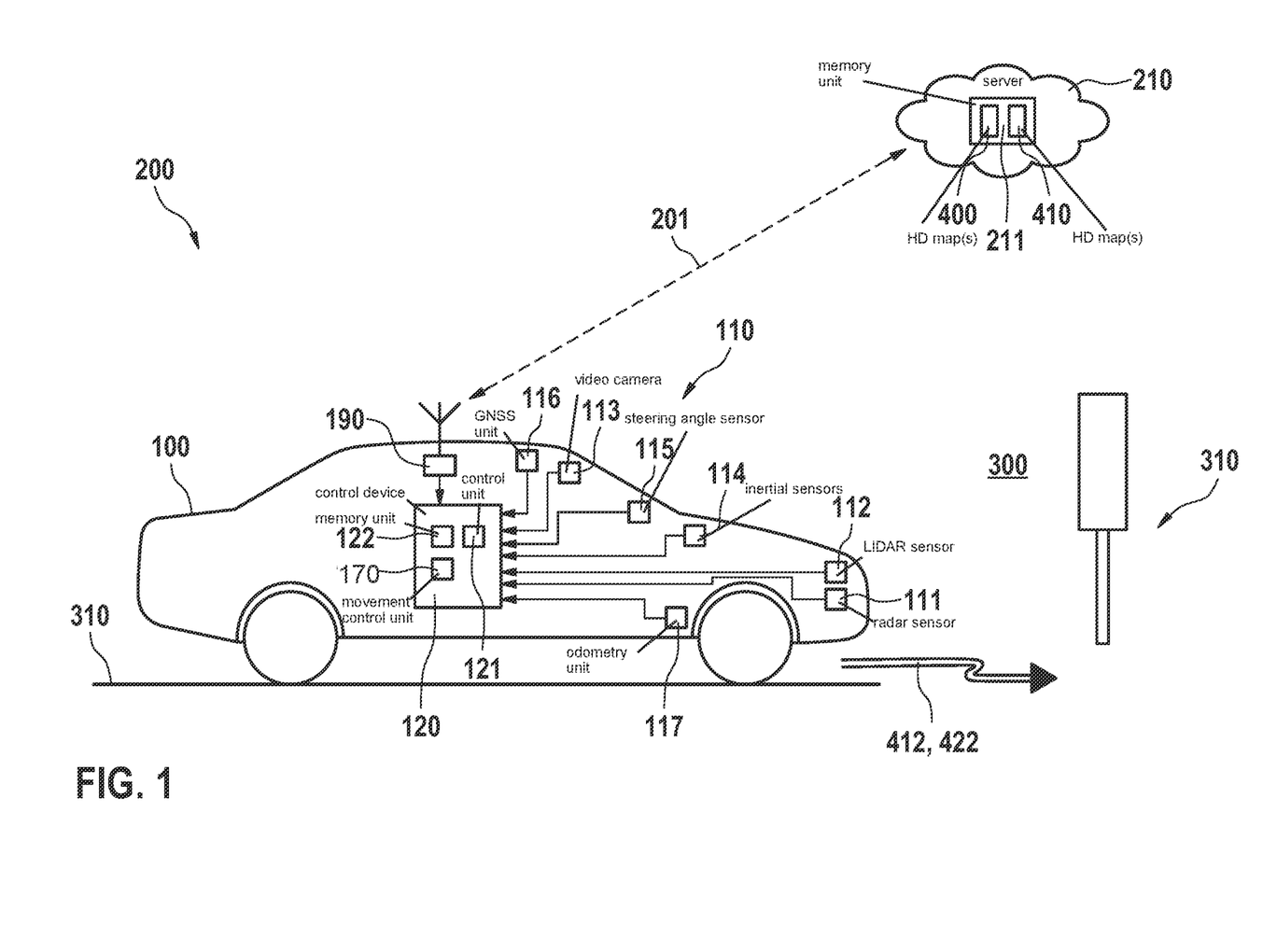
FIG. 1 schematically shows a system including an automated vehicle as well as an external server, according to an example embodiment of the present invention.

FIG. 1 schematically shows an automated vehicle 100 driving on a road 310. Automated vehicle 100 includes a surroundings sensor system 110 for detecting objects and structures in its surroundings 300 as well as a control device 120 for controlling automated vehicle 100. In the present example, surroundings sensor system 110 includes multiple surroundings sensors, such as, e.g., a radar sensor 111, a LIDAR sensor 112, and a video camera 113. Furthermore, automated vehicle 100 also includes sensors for detecting various measured variables and parameters, such as, e.g., inertial sensors 114 for detecting the instantaneous movement condition of automated vehicle 100, a steering angle sensor 115, a GNSS unit 116 for the satellite-based ascertainment of the global position of automated vehicle 100, as well as an odometry unit 117 for ascertaining the traveled distance, e.g., based on the rotary motion of the vehicle wheels. Automated vehicle 100 furthermore includes a wireless communication device 190 for establishing a wireless communication link 201 to an external server 210. As is shown in FIG. 1, automated vehicle 100 and the external server are part of a system 200 which may encompass further vehicles and servers and offers certain services (cloud services). In the present example, server 210 includes a memory unit 211 in which various digital HD maps 400, 410 are stored. During operation, automated vehicle 100 receives, from server 210, HD maps 400, 410 of the particular surroundings 300 in which automated vehicle 100 is presently situated. These digital HD maps 400, 410 are then stored in a memory unit 122 of control device 120.

As is furthermore shown FIG. 1, control device 120 includes at least one memory unit 122 for storing digital HD maps 400, 410, a control unit 121 for ascertaining an optimal trajectory 412, 422, as well as a movement control unit 170 for controlling the movement of automated vehicle 100 along the ascertained trajectory 412, 422.

Figure 2:
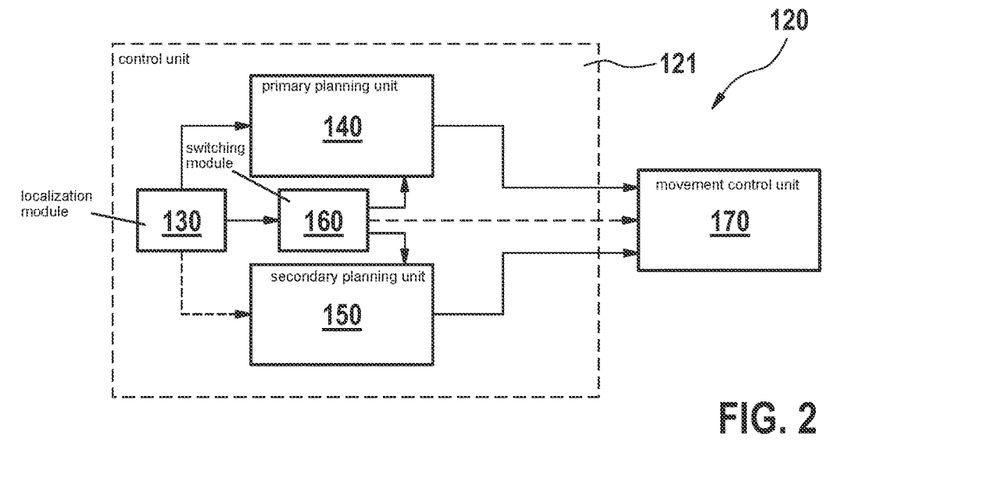
FIG. 2 shows a block diagram of the vehicle-internal control unit including a normal mode pipeline, a safety mode pipeline, and a switching module, according to an example embodiment of the present invention.

FIG. 2 schematically shows further details of control unit 121 from FIG. 1. Accordingly, control unit 121 includes a localization module 130, which ascertains the instantaneous global position of automated vehicle 100 based on the provided digital HD localization map 400 and the data provided by surroundings sensor system 110. Control unit 121 furthermore includes a primary planning unit 140, which is assigned to a normal mode and which, based on the ascertained global position and the provided digital planning map 410, ascertains a suitable trajectory 412 for automated vehicle 100. Control unit 121 furthermore also includes a secondary planning unit 150, which is assigned to a safety mode and which ascertains a suitable trajectory 422 for automated vehicle 100 only based on the data provided by surroundings sensor system 110. In addition, control unit 121 includes a switching module 160, which switches between the normal mode and the safety mode. For this purpose, switching module 160 checks the accuracy of the localization of localization module 130. When a suitable localization result is available, switching module 160 switches to the normal mode, in this case trajectory 412 ascertained in a map-based manner by primary planning unit 140 being transferred to movement control unit 170. If no suitable localization result is available, switching module 160, in contrast, switches to the safety mode, in this case trajectory 422 ascertained in a map-less manner by secondary planning unit 150 being transferred to movement control unit 170. Movement control unit 170 subsequently carries out a corresponding longitudinal control and lateral control of automated vehicle 100 to guide automated vehicle 100 along trajectory 412, 422 instantaneously provided by the particular selected planning unit 140, 150.

Figure 3:
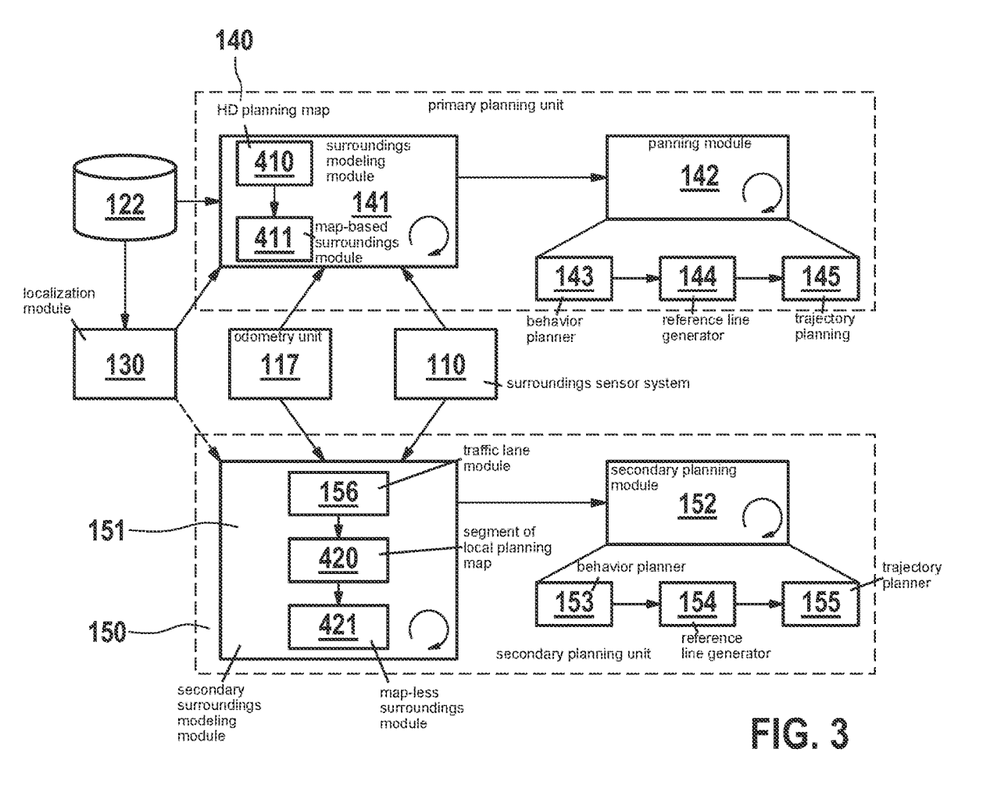
FIG. 3 shows a more detailed block diagram of the vehicle-internal control unit from FIG. 2.

FIG. 3 schematically shows further details of the two planning units 140, 150 from FIG. 2, which each include a surroundings modeling module 141, 151 as well as a planning module 142, 152 downstream therefrom. Primary surroundings modeling module 141 of primary planning unit 140 receives digital HD planning map 410 provided by external server 210 from a memory unit 122, the localization result instantaneously ascertained based on digital HD localization map 400 from localization module 130, and corresponding sensor data from surroundings sensor system 110 and corresponding odometry data from odometry unit 117. Based on these data, surroundings modeling module 141 cyclically creates a map-based surroundings model 411 of the instantaneous surroundings 300 of automated vehicle 100. Based on this map-less surroundings model 411, primary planning module 142 cyclically generates suitable trajectories 412, one of these trajectories 412 in each case being selected for transfer to movement control unit 170. For this purpose, primary planning module 142 includes a behavior planner 143, a reference line generator 144 downstream therefrom, as well as a trajectory planner 145 downstream therefrom.

In contrast thereto, secondary surroundings modeling module 151 of secondary planning unit 150 generates a corresponding map-less surroundings model 421 only based on the data of surroundings sensor system 110 and of odometry unit 117. As is apparent from FIG. 3, a segment 420 of a local planning map is generated for this purpose based on a traffic lane model 156 obtained from the sensor data, from which a map-less surroundings model 421 is finally generated by enrichment with further sensor data, such as, e.g., the dynamic agents recognized in the vehicle surroundings. Based on this map-based surroundings model 421, secondary planning module 152 also cyclically generates suitable trajectories 422, one of these trajectories 422 in each case being selected for transfer to movement control unit 170. For this purpose, primary planning module 142 also includes a corresponding behavior planner 153, a reference line generator 154 downstream therefrom, as well as a trajectory planner 155 downstream therefrom.

The present invention provides for an additional secondary planning unit 150 including a secondary planning module 152, which takes over the control if primary planning module 142 cannot supply any results, or cannot supply any meaningful results, due to the aforementioned situations. For this purpose, automated vehicle 100 uses on-board surroundings sensors 111, 112, 113 for recognizing roadway markings 314 through 317 and creates a segment 420 of a local planning map therefrom.

Thereafter, dynamic agents 330 through 335 recognized with the aid of surroundings sensors 111, 112, 113 are associated with the newly created segment 420 of the local planning map to generate a map-less surroundings model 421 of the immediate surroundings of automated vehicle 100. When localization module 130 does not supply a precise localization result, the odometry data collected by odometry unit 117 since the last precise localization are used for estimating the instantaneous global position of automated vehicle 100. Subsequently, behavior planner 153 within second planning module 152 is degraded into a special mode which forces automated vehicle 100 to remain in the present negotiable corridor. In contrast to behavior planner 143 of primary planning module 142 used in the normal mode, behavior planner 153 does not supply any semantic information, but only physical information for trajectory planner 155 downstream therefrom to plan a safe trajectory 422. Secondary planning module 152 preferably always runs in parallel to primary planning module 142 and thus also acts as a supervisor to check the correctness of the data of provided HD maps 400, 410. As soon as the change between the normal mode and the safety mode is triggered, secondary planning module 152 may link its trajectory 422 to the previous one, by which a smooth movement control of automated vehicle 100 is ensured.

The normal mode, which is based on digital HD maps 400, 410 collected in advance, preferably focuses on comfort and intelligence. In contrast, the safety mode preferably focuses on the safety and the physical world in the close range detectable by the on-board sensors. These two systems do not conflict with one another, but work together within the meaning of "being prepared for the worst, but driving comfortably and intelligently when the situation allows."

FIGS. 2 and 3 show a functional overview of the described architecture. In primary planning unit 140 representing the planning pipeline for the normal mode, the data from the localization, odometry 117 and surroundings sensor system 110, together with the previously collected HD planning map 410, are fed into a map-based primary surroundings modeling module 141. For the safety mode, a further surroundings model 421 around automated vehicle 100 is created, which utilizes the pieces of information detected by sensors 111, 112, 113 for creating a segment 420 of the local planning map in each planning cycle.

Surroundings model 421 for the safety mode is referred to as "map-less" here to illustrate that no map collected in advance is used for this purpose. These two surroundings modeling modules 141, 152 are started in two parallel process strands. When the map-based normal mode reaches an error state, secondary planning module 152 sends its instantaneously calculated trajectory 422 to movement control unit 170.

The devices, units, and modules described here may be implemented both in the form of software or hardware, or a combination of software and hardware.

Figure 4:
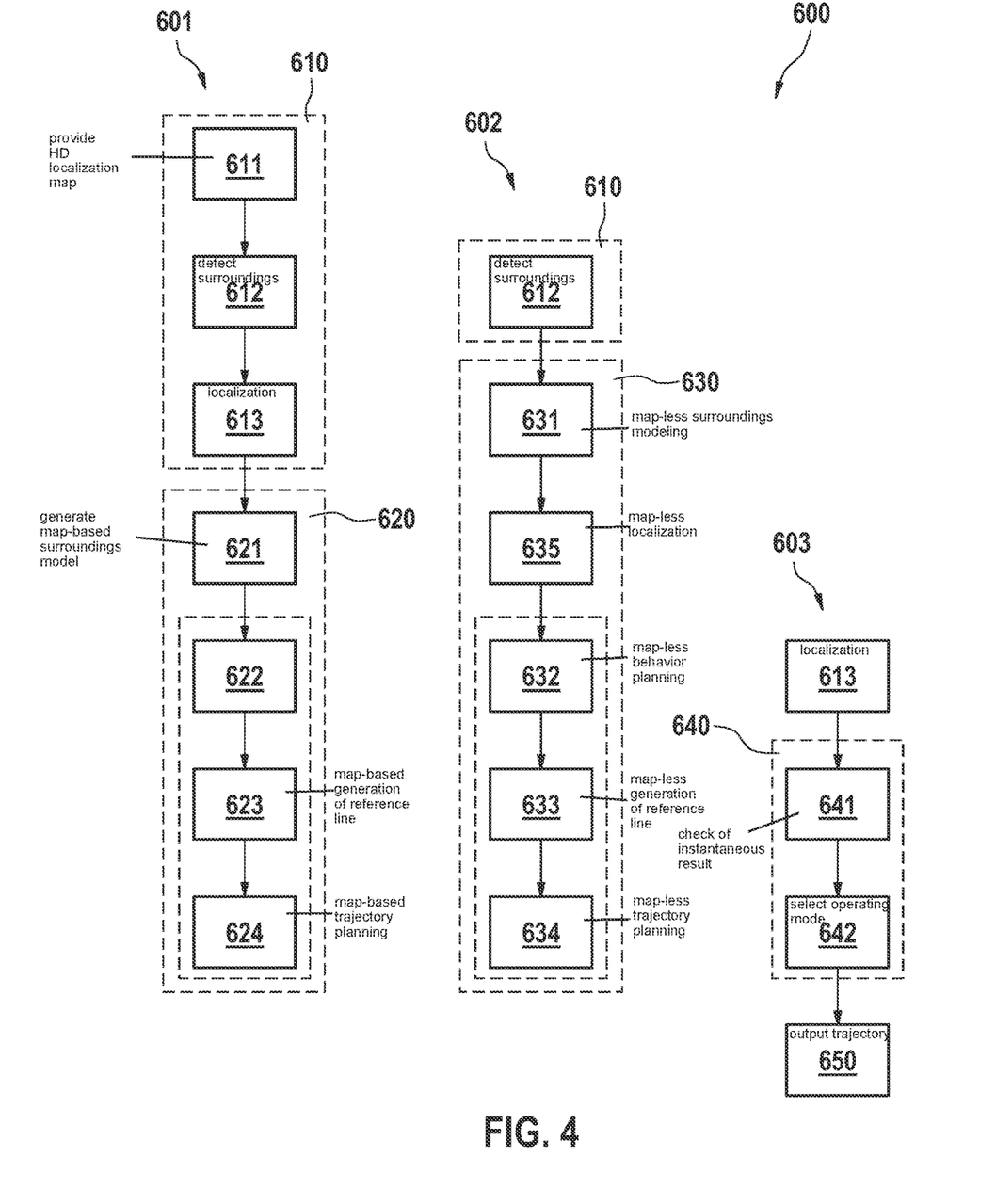
FIG. 4 shows a flow chart of various method parts of the method, according to an example embodiment of the present invention.

FIG. 4 shows a simplified flowchart of the method described here. The method is broken down into three different method strands 601, 602, 603, which are carried out independently of one another and are at least partially temporally superimposed. For better illustration, the various method strands 601, 602, 603 are shown next to one another. In the process, first method strand 601 represents the normal mode in which the trajectory planning takes place regularly, i.e., based on HD maps. In a first method part 610, a method step 611 takes place, in which a HD localization map 400 is provided. Furthermore, in method step 612, the detection of the surroundings of automated vehicle 100 with the aid of surroundings sensor system 110 takes place. Thereafter, in method step 613, a localization of automated vehicle 100 is carried out based on a comparison of the data of surroundings sensor system 110 to features of HD localization map 400. In the subsequent second method part 620, a suitable trajectory for automated vehicle 100 is calculated based on the localization result from first method part 610. For this purpose, a map-based surroundings modeling is carried out in method step 621, in which a map-based surroundings model 411 is generated. In the subsequent method step 623, a map-based generation of a reference line takes place. Finally, in method step 624, a map-based trajectory planning is carried out, in which an optimal trajectory 422 for the present planning cycle is ascertained.

Second method strand 602, in contrast, represents the additional safety mode in which the trajectory planning takes place without the HD maps. In the process, only method step 612 from first method part 610 is used, which represents the detection of the vehicle surroundings with the aid of surroundings sensor system 110. Thereafter, a map-less surroundings modeling takes place in method step 631. In the process, initially a segment 420 of the local planning map is generated based on the data provided by surroundings sensor system 110, from which a map-less surroundings model 421 is generated by enrichment with further data of surroundings sensor system 110. Furthermore, a map-less localization takes place in method step 635, in which the position of automated vehicle 100 in segment 420 of the local planning map or map-less surroundings model 421 is determined. In the subsequent method step 632, a map-less behavior planning takes place. Thereafter, in method step 633, a map-less generation of a suitable reference line takes place. Finally, in method step 634, a map-less trajectory planning takes place, in which an optimal trajectory 422 for the present planning cycle is calculated.

In third method strand 603, which encompasses a fourth method part 640, it is decided which of the two trajectories 412, 442 ascertained in the various modes is to be used for controlling automated vehicle 100. For this purpose, in method step 641, initially a check of the instantaneous result of the localization carried out in method step 613 based on HD localization map 400 takes place. As a function of the result of this check, a selection of the particular operating mode takes place in the subsequent method step 642. In the process, it is decided whether the normal mode is activated and trajectory 412 ascertained with the aid of primary planning unit 140 is used for controlling automated vehicle 100, or whether the safety mode is activated and trajectory 422 ascertained with the aid of secondary planning unit 150 is used for controlling automated vehicle 100. Finally, in method step 650, an output of trajectory 412, 422 calculated in the respective selected operating mode to movement control unit 170 of automated vehicle 100 takes place.

Figure 5:
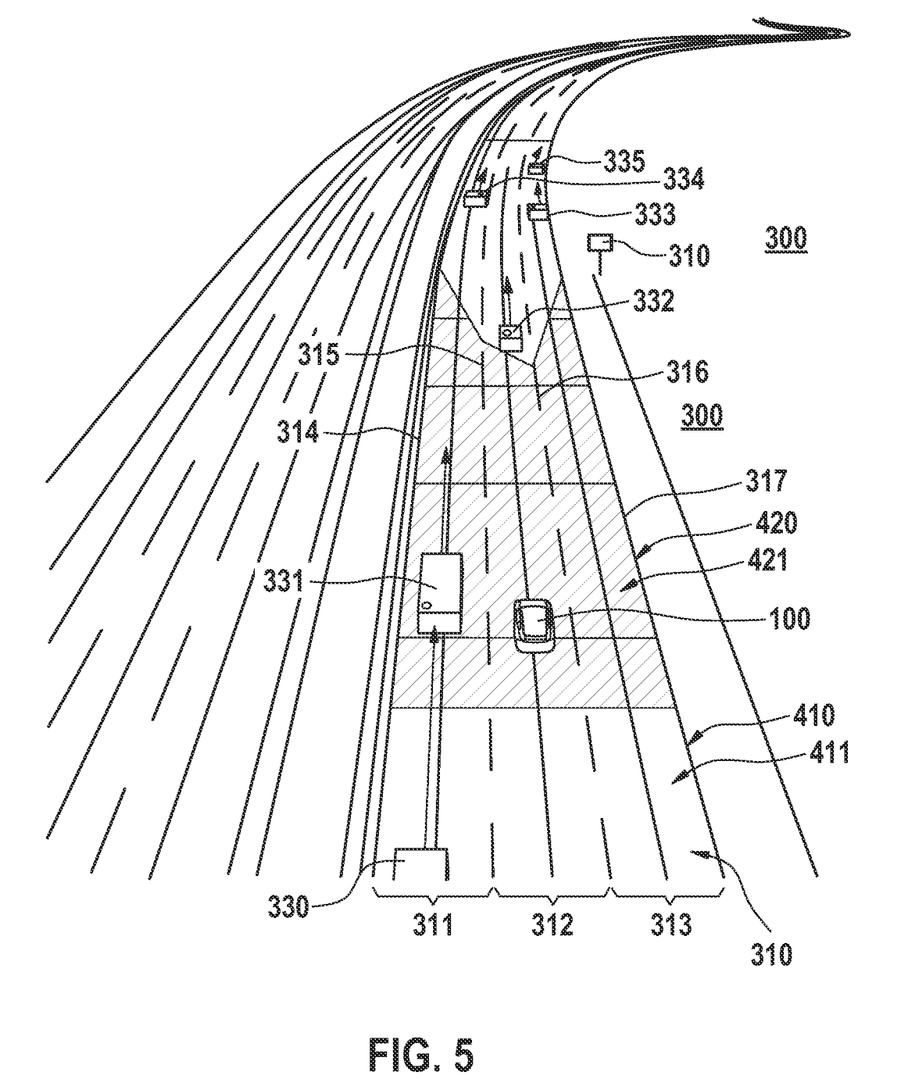
FIG. 5 shows a map-less digital surroundings model superimposed on a map-based surroundings model of the same surroundings, according to an example embodiment of the present invention.

FIG. 5 illustrates the local generation of local planning map segment 420 based on the data provided by surroundings sensor system 110. In this way, a video camera 113 may be integrated into the system, for example, which is already able to recognize roadway markings 314 through 317 and to provide high-quality roadway models in clothoids. In FIG. 5, center lines 315, 316 represent the boundary lines of present traffic lane 312 of automated vehicle 100, and outer lines 314, 317 represent the boundary lines of adjoining traffic lanes 311, 313. Moreover, video camera 113 is able to recognize open negotiable space, which provides additional specifications to secondary planning module 152 in the next phase. Subsequent to the traffic lane model generation based on clothoids, the data are converted into an internal map format, so that secondary planning module 152 may access it. Segment 420 of the local planning map thus generated is initially present in vehicle-based coordinate system 520 and moves along with vehicle 100 in each planning cycle. With the aid of the transformation formulas explained in connection with FIG. 7, local planning map 420, however, may always be transformed into global coordinate system 510, regardless of whether localization module 130 fails or not.

In FIG. 5, the hatched area marks a segment 420 of the local planning map which is instantaneously generated by vehicle 100 and which is superimposed with the provided HD planning map 410. When localization module 130 is fully functional, the instantaneously generated segment 420 of the local planning map should be aligned with the previously detected HD planning map 410 in the map plane situated therebeneath and projected well thereon.

So-called "negotiable corridors" may be derived from the locally generated planning map segment 420, which show continuous trajectories on which automated vehicle 100 may move in the present situation. The negotiable corridor is typically represented by a sequence of vector 3D points and a sequence of widths measured at the particular points. Based on these pieces of information, an optimization process may then be carried out to obtain a denser and smoother curve, which describes this negotiable corridor. Since the negotiable corridor, in the close range of automated vehicle 100, in general only changes slightly from one to the other planning cycle, a new optimization process is not necessary for each planning cycle. An algorithm may therefore be provided, which only triggers the optimization process when automated vehicle 100 makes a significant movement forward, which is parameterizable.

Figure 6:
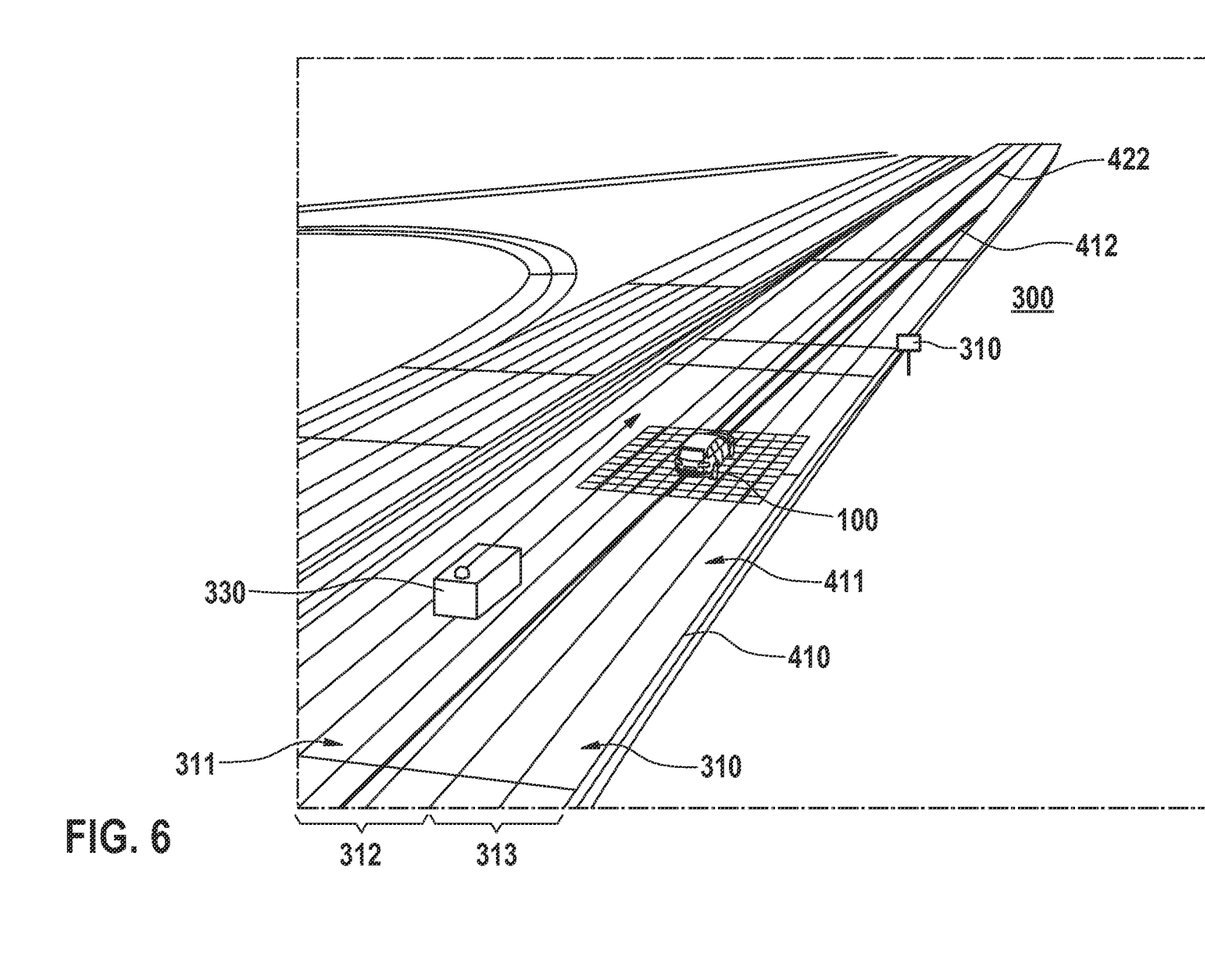
FIG. 6 shows a digital surroundings model including the trajectories generated by the two planning modules, according to an example embodiment of the present invention.

As was already described in connection with FIG. 2, trajectory 412 created by primary planning module 142 for the normal mode is transferred in the normal mode to movement control unit 170 of automated vehicle 100 to control the vehicle movement. This trajectory 412 is also buffered for both planning modules 142, 152 for the next planning cycle, so that planning modules 142, 152 are able to append their respective newly ascertained trajectories 412, 422 to the previous one. When the transition from the normal mode to the safety mode is triggered, the process strand for the surroundings modeling in the normal mode may be stopped, and the trajectory generation in the normal mode will be skipped, while the surroundings modeling and the trajectory generation for the safety mode continue to run. In this transition cycle between normal mode and safety mode, secondary planning module 152 continues to use trajectory 412 of primary planning module 142 ascertained in the normal mode from the previous planning cycle to create its instantaneous trajectory 422. Following the transition cycle, secondary planning module 152 uses trajectory 422 previously generated by itself to ensure its instantaneous trajectory 422. To illustrate the transition from the normal mode to the safety mode, FIG. 6 shows a map-based surroundings model 411 including a vehicle 100 driving on a multi-lane road 310. Surroundings model 411 also encompasses a further vehicle 330, whose driving direction and speed are visualized with the aid of an arrow. For the normal mode, a bundle of different trajectories is generally generated by primary planning module 142, the vertical distance of the trajectories with respect to the roadway plane typically indicating the respective vehicle speed. The single trajectory 412 shown in FIG. 6 is that which was ascertained by primary planning module 142 as the best from the bundle of calculated trajectories, and which the movement control of automated vehicle 100 followed up until this point in time. The second line represents trajectory 422 instantaneously calculated by secondary planning module 152, which is attached to the existing trajectory 412 and which the movement control of automated vehicle 100 now follows after the transition from the normal mode to the security mode.

Figure 7:
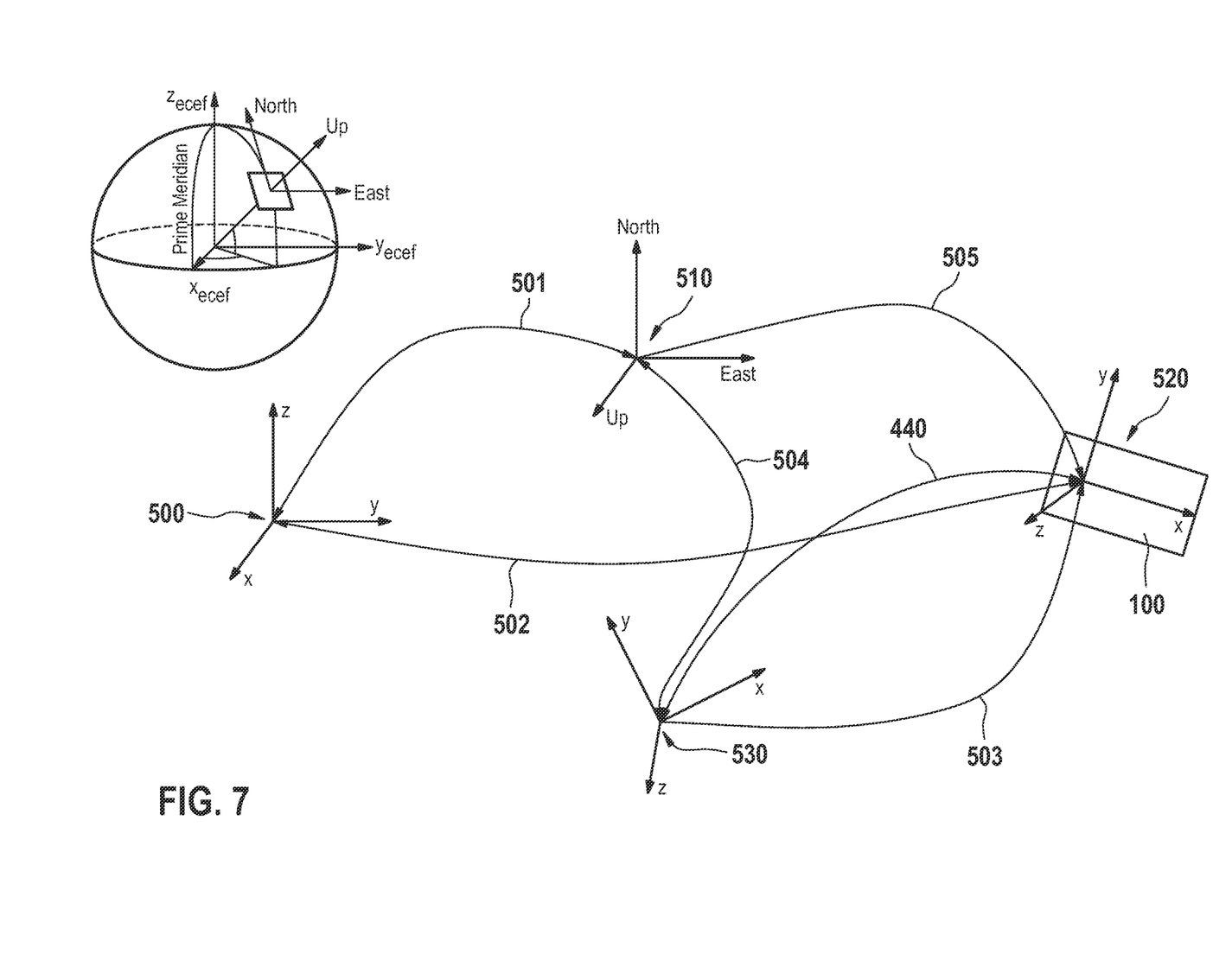
FIG. 7 shows a diagram for illustrating the transformations between the various coordinate systems, according to an example embodiment of the present invention.

FIG. 7 illustrates the various coordinate systems used in the method as well as the fundamental coordinate transformations. Accordingly, in the normal mode, HD planning map 410 supplies information, such as, e.g., points on roadway markings 314 through 317, in a global coordinate system 510, which is referred to as map enu frame. In contrast, sensor system 110 supplies the conditions of the surrounding agents (objects in the surroundings of the automated vehicle) in a local coordinate system 520 which is fixedly assigned to vehicle 100 and referred to as vehicle_origin frame. To fuse the data from the various coordinate systems 510, 520, primary planning module 142 in each planning cycle must calculate the following transformation between the two coordinate systems 510, 520:

$$\text{map}\_T\_\text{vehicle\_origin} = \text{map}\_T\_\text{ecef} \times \text{ecef}\_T\_\text{vehicle\_origin}$$

In the process, map_T_ecef corresponds to the static transformation 501 from an earth-centered and earth-based coordinate system 500, which is referred to as Earth-Centered Earth-Fixed (ECEF) frame, to global coordinate system 510 of HD map 410. Furthermore, ecef_T_vehicle_origin refers to a transformation 502 from the earth-centered and earth-fixed coordinate system 500 to vehicle-based coordinate system 520, which corresponds to the instantaneous localization result or may be derived therefrom.

When localization module 130 supplies no or only an imprecise global vehicle position, the result must be ascertained based on the last known precise global localization of automated vehicle 100. This also takes place with the aid of the ecef_T_vehicle_origin transformation 502, which in this case, however, is calculated as follows:

$$\text{ecef}\_T\_\text{vehicle\_origin} = \text{ecef}\_T\_\text{map} \times \text{last}\_\text{map}\_T\_\text{odom} \times \text{odom}\_T\_\text{vehicle\_origin}$$

In the process, last_map_T_odom corresponds to the last known precise transformation 504 from global coordinate system 510 into an odom coordinate system 530, which is assigned to the location of the last accurate position of automated vehicle 100.

This transformation 505 is always recorded standard in the normal mode and does not change, as long as no new precise localization result is present. In contrast, odom_T_vehicle_origin refers to a transformation 503 from odom coordinate system 530 into vehicle-based coordinate system 520.

This transformation 503 results based on the odometry data updated in each planning cycle. The odometry data correspond to distance 440 traveled since the last precise localization of vehicle 100, which is detected with the aid of an on-board odometry unit 117. From the above-mentioned formula, furthermore the following conversion results for the transformation from global coordinate system 510 into vehicle-based coordinate system 520:

$$\text{map}\_T\_\text{odom} = \text{ecef}\_T\_\text{map.inv} \times \text{ecef}\_T\_\text{vehicle\_origin} \times \text{odom}\_T\_\text{vehicle\_origin.inv}$$

As a result, automated vehicle 100, even after a malfunction of the localization module, is still able to transform agents (e.g., other road users) perceived in its surroundings 300, roadway markings, and obstacles, from vehicle-based coordinate system 520 (vehicle_origin) into global coordinate system 510 assigned to the global map, which enables a smooth transition from the normal mode to the safety mode.

In addition to a normal mode, in which the highly automated driving function takes place based on HD maps, the concept introduced here also provides an additional safety mode, which also renders the highly automated driving function (HAD, highly autonomous driving) safe for the user in such situations in which no sufficient localization with the aid of an HD map is ensured. While the normal mode continues to enable intelligent driving functions in the case of a functioning map-based localization thanks to the HD maps, the safety mode preferably focuses on essential physical conditions which are necessary for ensuring the driving safety.

The new concept may be used in HAD systems above Level 3, in which a permanent monitoring by the driver is not required. This relates, for example, to functions such as the traffic jam pilot, the highway pilot, or the urban robotic taxi. The concept may furthermore also be used to improve the performance in L2+ADAS systems which are based on HD maps, such as, e.g., the hands-free function.

Although the present invention was illustrated and described in detail by the preferred exemplary embodiments, the present invention is not limited by the described examples. Rather, other variations may be derived therefrom by those skilled in the art without departing from the scope of protection of the present invention.

What is claimed is:

1. A method for controlling an automated vehicle, the method comprising:
   in a first method part, detecting instantaneous surroundings of the automated vehicle using an on-board surroundings sensor system, and localizing the automated vehicle based on a comparison of data of the surroundings sensor system to a previously provided digital HD localization map;
   in a second method part representing a normal mode, generating a map-based surroundings model of the instantaneous surroundings of the automated vehicle based on a global position of the automated vehicle ascertained during the localization and a previously provided digital HD planning map, the map-based surroundings model being used for planning an instantaneous trajectory for the automated vehicle; and
   in a third method part which represents a safety mode and carried out in parallel to or as an alternative to the first method part, detecting the instantaneous surroundings of the automated vehicle using the on-board surroundings sensor system, generating, based on data ascertained in the process, a map-less surroundings model of the instantaneous surroundings of the automated vehicle, the map-less surroundings model being used for planning the instantaneous trajectory of the automated vehicle;
   wherein:
   the instantaneous trajectory calculated in the normal mode or in the safety mode is output for controlling movement of the automated vehicle along the trajectory; and
   the method includes at least one of the following features (I)-(III):
   (I) a seamless transition is provided between the normal mode and the safety mode by at least one of:
      (i) running the generating and planning of the safety mode while the normal mode is running and being used for the calculation of the instantaneous trajectory; and
      (ii) performing trajectory linking that blends a portion of the instantaneous trajectory planned with the safety mode to another portion of the instantaneous trajectory planned with the normal mode, using an end point of the portion planned with the normal mode as a start point of the portion planned with the safety mode;
   (II) the planning of the instantaneous trajectory in the safety mode is degraded compared to the planning of the instantaneous trajectory in the normal mode in that the planning in the normal mode is according to safety and comfort considerations and the planning in the safety mode is according to the safety considerations and not the comfort considerations; and
   (III) the generation of the map-less surroundings model in the safety mode includes:
      using the on-board surroundings sensor system to detect boundaries of a roadway being traversed by the automated vehicle and to detect dynamic objects;
      generating from the detected roadway boundaries a traffic lane model that represents an organization of traffic lanes within the roadway; and
      generating, as the map-less surroundings model, a portion of a local planning map using the traffic lane model with positions of the detected dynamic objects added to the portion of the local planning map.

2. The method as recited in claim 1, wherein in a fourth method part, an accuracy of the localization from the first method part being checked, and wherein, when, during the localization, a precise global position of the automated vehicle was ascertained, the instantaneous trajectory calculated in the second method part is output for controlling the movement of the automated vehicle, and, when, during the localization, no or only an imprecise global position of the automated vehicle was ascertained in the first part, the instantaneous trajectory calculated in the third method part being output for controlling the movement of the automated vehicle.

3. The method as recited in claim 2, wherein a distance traveled by the automated vehicle is detected using an on-board odometry unit, and when the localization in a present method cycle does not supply a precise global position of the automated vehicle, the instantaneous global position of the automated vehicle is ascertained based on the global position of the automated vehicle ascertained during a last accurate localization, and the distance of the automated vehicle detected since then using the odometry unit.

4. The method as recited in claim 1, wherein the map-less surroundings model ascertained in the third method part is used for validating correctness of at least one provided digital HD map and/or for checking results of the localization from the first method part.

5. The method as recited in claim 1, wherein in the third method part, the map-less surroundings model is generated in a vehicle-based local coordinate system, objects included in the map-less surroundings model being transformed from vehicle-based local coordinate system into a global coordinate system underlying the HD planning map to ensure a seamless transition from the normal mode into the safety mode.

6. The method as recited in claim 1, wherein the planning of the behavior and of the trajectory of the automated vehicle carried out in the second method part based on the map-based surroundings model is paused when the localization in a present method cycle does not supply a precise global position of the automated vehicle.

7. The method as recited in claim 1, wherein the method includes the seamless transition by the running of the generating and planning of the safety mode while the normal mode is running and being used for the calculation of the instantaneous trajectory.

8. The method as recited in claim 1, wherein the method includes the seamless transition by the performing of the trajectory linking that blends the portion of the instantaneous trajectory planned with the safety mode to the other portion of the instantaneous trajectory planned with the normal mode, using the end point of the portion planned with the normal mode as the start point of the portion planned with the safety mode.

9. The method as recited in claim 8, wherein:
the method further comprises transforming data between global and vehicle-based coordinate systems; and
the trajectory linking is performed based on the transformation of the data between the global and vehicle-based coordinate systems.

10. The method as recited in claim 9, wherein:
the HD localization map and the HD planning map represent map elements relative to the global coordinate system; and
the map-less surroundings model represents elements relative to vehicle-based coordinate system in which locations are represented relative to the automated vehicle.

11. The method as recited in claim 10, wherein:
the transformation is performed using a geocentric coordinate system as an intermediary coordinate system.

12. The method as recited in claim 1, wherein the planning of the instantaneous trajectory in the safety mode is degraded compared to the planning of the instantaneous trajectory in the normal mode in that the planning in the normal mode, the planning is according to the safety and comfort considerations and, in the safety mode, the planning is according to the safety considerations and not the comfort considerations.

13. The method as recited in claim 1, wherein the generation of the map-less surroundings model in the safety mode includes:
the using of the on-board surroundings sensor system to detect the boundaries of the roadway being traversed by the automated vehicle and to detect the dynamic objects;
the generating from the detected roadway boundaries of the traffic lane model that represents the organization of the traffic lanes within the roadway; and
generating, as the map-less surroundings model, of the portion of the local planning map using the traffic lane model with the positions of the detected dynamic objects added to the portion of the local planning map.

14. A control unit for an automated vehicle, the control unit comprising:
a processor system that includes at least one processor, the processor system being configured to:
ascertain a global position of the automated vehicle based on a comparison of an HD localization map to data of an on-board surroundings sensor system;
in a normal mode:
generate a map-based surroundings model of instantaneous surroundings of the automated vehicle based on the ascertained global position and, using a provided HD planning map; and
plan a trajectory of the automated vehicle based on the map-based surroundings model; and
in a safety mode:
generate a map-less surroundings model of the surroundings of the automated vehicle based on the data provided by the surroundings sensor system and an odometer; and
plan the trajectory of the automated vehicle based on the map-less surroundings model;
wherein the control unit includes at least one of the following features (I)-(III):
(I) a seamless transition is provided between the normal mode and the safety mode by at least one of:
(i) running the generation and planning of the safety mode while the normal mode is running and being used for the calculation of the instantaneous trajectory; and
(ii) performing trajectory linking that blends a portion of the trajectory planned with the safety mode to another portion of the trajectory planned with the normal mode, using an end point of the portion planned with the normal mode as a start point of the portion planned with the safety mode;
(II) the planning of the trajectory in the safety mode is degraded compared to the planning of the trajectory in the normal mode in that the planning in the normal mode is according to safety and comfort considerations and the planning in the safety mode is according to the safety considerations and not the comfort considerations; and
(III) the generation of the map-less surroundings model in the safety mode includes:
using the on-board surroundings sensor system to detect boundaries of a roadway being traversed by the automated vehicle and to detect dynamic objects;
generating from the detected roadway boundaries a traffic lane model that represents an organization of traffic lanes within the roadway; and
generating, as the map-less surroundings model, a portion of a local planning map using the traffic lane model with positions of the detected dynamic objects added to the portion of the local planning map.

15. The control unit as recited in 14, wherein the processor system is further configured to check an accuracy of the ascertained global position of the automated vehicle ascertained, switch operation of the automated vehicle from controlling based on the normal mode, in which control of the automated vehicle is carried out based on the trajectory generated in the normal mode, to controlling based on the safety mode, in which the control of the automated vehicle is carried out based on the trajectory generated in the safety mode, based on the check showing that no precise global position of the automated vehicle was ascertained by the localization module.

16. A non-transitory computer-readable memory medium on which is stored a computer program for controlling an automated vehicle, the computer program, when executed by a computer, causing the computer to perform a method that includes the following:
in a first method part, detecting instantaneous surroundings of the automated vehicle using an on-board surroundings sensor system, and localizing the automated vehicle based on a comparison of data of the surroundings sensor system to a previously provided digital HD localization map;

in a second method part representing a normal mode, generating a map-based surroundings model of the instantaneous surroundings of the automated vehicle based on a global position of the automated vehicle ascertained during the localization and a previously provided digital HD planning map, the map-based surroundings model being used for planning an instantaneous trajectory for the automated vehicle; and in a third method part which represents a safety mode and carried out in parallel to or as an alternative to the first method part, detecting the instantaneous surroundings of the automated vehicle using the on-board surroundings sensor system, generating, based on data ascertained in the process, a map-less surroundings model of the instantaneous surroundings of the automated vehicle, the map-less surroundings model being used for planning the instantaneous trajectory of the automated vehicle;

wherein:
   the instantaneous trajectory calculated in the normal mode or in the safety mode is output for controlling movement of the automated vehicle along the trajectory; and    the method includes at least one of the following features (I)-(III);
     (I) a seamless transition is provided between the normal mode and the safety mode by at least one of:
       (i) running the generating and planning of the safety mode while the normal mode is running and being used for the calculation of the instantaneous trajectory; and
      (ii) performing trajectory linking that blends a portion of the instantaneous trajectory planned with the safety mode to another portion of the instantaneous trajectory planned with the normal mode, using an end point of the portion planned with the normal mode as a start point of the portion planned with the safety mode;
     (II) the planning of the instantaneous trajectory in the safety mode is degraded compared to the planning of the instantaneous trajectory in the normal mode in that the planning in the normal mode is according to safety and comfort considerations and the planning in the safety mode is according to the safety considerations and not the comfort considerations; and
     (III) the generation of the map-less surroundings model in the safety mode includes:
       using the on-board surroundings sensor system to detect boundaries of a roadway being traversed by the automated vehicle and to detect dynamic objects;
       generating from the detected roadway boundaries a traffic lane model that represents an organization of traffic lanes within the roadway; and
       generating, as the map-less surroundings model, a portion of a local planning map using the traffic lane model with positions of the detected dynamic objects added to the portion of the local planning map.

* * * * *